United States Patent Office 3,436,429
Patented Apr. 1, 1969

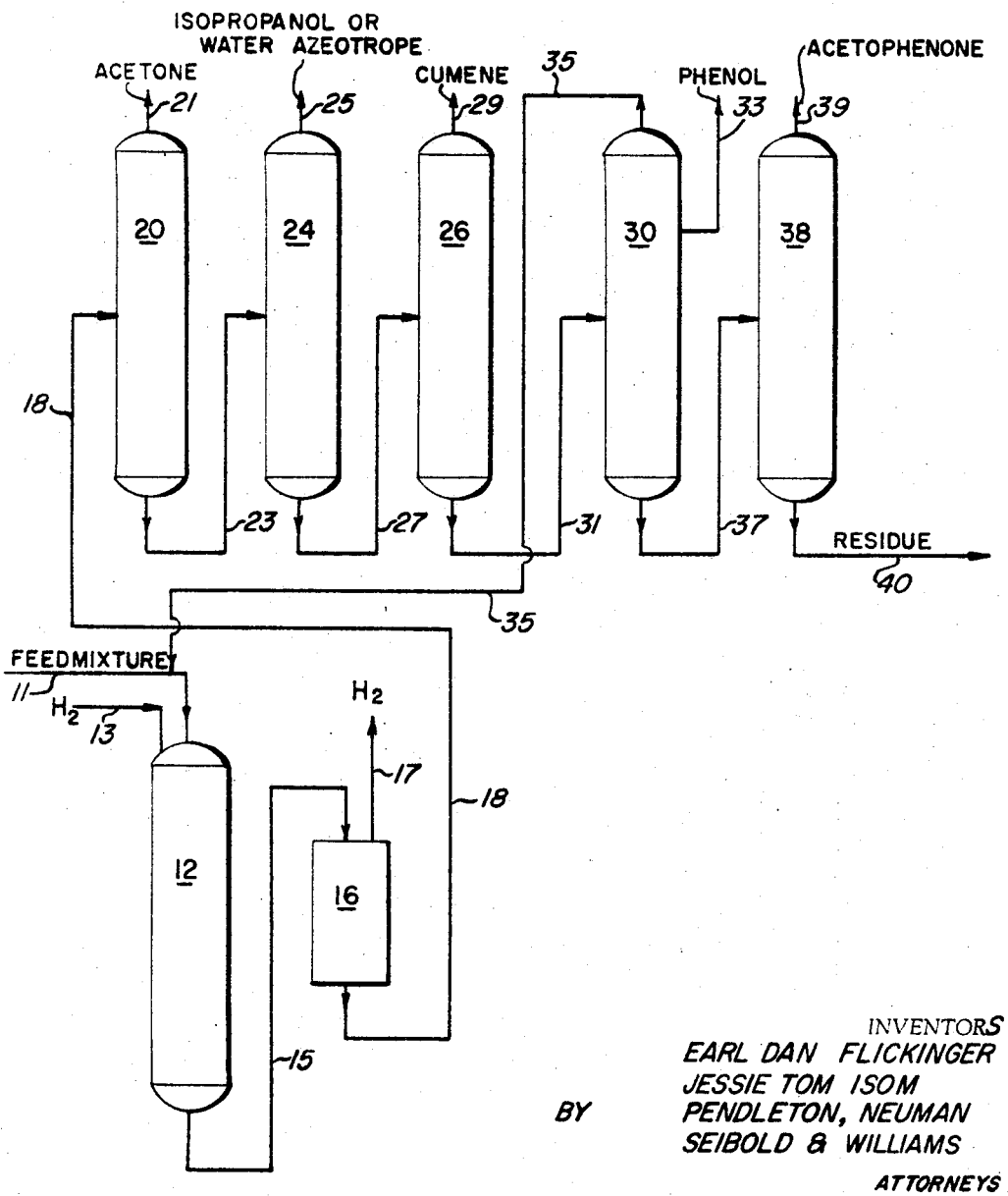

3,436,429
HYDROGENATION PROCESS
Earl Dan Flickinger and Jessie Tom Isom, El Dorado, Kans., assignors to Skelly Oil Company, Tulsa, Okla., a corporation of Delaware
Filed Nov. 23, 1966, Ser. No. 596,612
Int. Cl. C07c 37/24, 39/04, 5/14
U.S. Cl. 260—621                    4 Claims

ABSTRACT OF THE DISCLOSURE

A process of treating a reaction mixture resulting from the production of phenol by oxidation of cumene and decomposition and dehydration of the reaction product wherein said reaction mixture is hydrogenated with a hydrogenation catalyst to separate cumene, phenol and acetone or isopropyl alcohol.

---

This invention relates to the treatment of a reaction mixture resulting from a process for producing phenol by the oxidation of cumene and the subsequent decomposition of the resulting cumene hydroperoxide.

The production of phenol by the oxidation of cumene and the decomposition and dehydration of the resulting products is well known. Various products in addition to the phenol are usually obtained as a result of this process, including acetone, α-methylstyrene, acetophenone and a residue of polymeric materials. The reaction mixture may also contain unreacted cumene. From an economic standpoint it is desirable to convert the α-methylstyrene to cumene, which can then be used for the production of additional phenol. It is known in the art that α-methylstyrene can be converted to cumene by hydrogenation. The prior art processes for accomplishing this generally involve separation of an α-methylstyrene stream and selective hydrogenation of the stream.

It has now been found in accordance with the present invention that it is possible to hydrogenate α-methylstyrene in a reaction mixture from the phenol production process without first separating the α-methylstyrene from other products in the stream. This, of course, greatly simplifies the processing and reduces equipment requirements.

In accordance with the present invention a reaction mixture comprising acetone, phenol, α-methylstyrene, cumene, acetophenone and a residue of polymeric materials is subjected to hydrogenation using as a hydrogenation catalyst palladium or nickel-molybdenum. Preferably, the hydrogenation is effected using relatively mild hydrogenation conditions of temperature and pressure. In this manner processing of the stream is greatly simplified and α-methylstyrene is effectively converted to cumene without affecting the yield or quality of the desired phenol. With the use of the nickel-molybdenum catalyst the hydrogenation conditions are important with respect to the conversion of acetone to isopropyl alcohol.

In one embodiment of the invention the hydrogenation is carried out using a palladium catalyst at a temperature of from about 80° F. to about 225° F., preferably from about 100° F. to 200° F., and at a pressure of from atmospheric to about 150 p.s.i.g., preferably atmospheric to 100 p.s.i.g. Under these hydrogenation conditions α-methylstyrene is effectively converted to cumene without affect on the yield of phenol According to a second embodiment of the invention, the hydrogenation is carried out using a nickel-molybdenum catalyst at a temperature of from about 100 to 300° F., preferably at a temperature of from about 200 to 300° F., and at a pressure of from atmospheric to 500 p.s.i.g., preferably 300 to 500 p.s.i.g. Under these conditions the α-methylstyrene is effectively converted to cumene and acetone converted to isopropyl alcohol. When using the nickel-molybdenum hydrogenation catalyst considerably lower temperature and pressures can be employed if conversion of acetone to isopropyl alcohol is not a desideratum. Thus, with a nickel-molybdenum hydrogenation catalyst if it is desired only to convert α-methylstyrene to cumene without appreciable conversion of acetone to isopropyl alcohol the hydrogenation can be carried out at a temperature of from about 100 to 225° F. and a pressure of from atmospheric to 100 p.s.i.g.

In all cases the space velocity employed for the hydrogenation is not critical and can be varied for optimum processing advantages. A space velocity of from about 1.0 to 2.25 v./v./hr. or higher can be employed satisfactorily. Likewise, sufficient hydrogen is employed to insure the substantially complete conversion of α-methylstyrene to cumene. Thus, an excess of hydrogen is used and may, for example, amount to about 1,100 to 3,000 standard cubic feet per barrel of feed. Provision can be made to recover or recycle the excess hydrogen which is not consumed in the reaction. If recycle hydrogen is employed for the hydrogenation it is preferred to maintain the purity of the recycle hydrogen stream above 90%, particularly if the recycle stream includes hydrogen from other chemical processes such as are fequently carried out in the petroleum refining industry.

The advantages of the present invention will become further apparent from the following detailed description thereof taken in conjunction with the drawing which represents a schematic flow sheet.

Thus, the entire reaction mixture resulting from oxidation of cumene and decomposition and dehydration of the product including a mixture of acetone, phenol, α-methylstyrene, acetophenone, unreacted cumene and a residue comprising polymeric materials passes through line 11 into hydrotreater 12. Hydrogen is introduced through line 13. This charge passes over a fixed bed of a hydrogenation catalyst comprising a palladium or nickel-molybdenum catalyst. In hydrotreater 12 the hydrogenation is effected and the hydrogenation conditions can vary as indicated above.

After hydrotreating, the reaction mixture is conveyed through line 15 to hydrogen separator 16 from which hydrogen is recovered via line 17. From hydrogen separator 16 the hydrogenated mixture is subjected to fractionation to separate the various products therein. Thus, the hydrogenated mixture is sent via line 18 to acetone column 20 wherein acetone is removed by distillation. Acetone distillation column 20 is operated at a temperature from 39° C. (102° F.) to 57° C. (135° F.) and a pressure from 400 millimeters to 760 millimeters under which conditions acetone is distilled and removed via line 21. If the hydrogenation is carried out under conditions as specified above to convert appreciable amounts of acetone to isopropyl alcohol, the bottoms fraction from acetone column 20 as passed via line 23 to the isopropanol distillation column 24. This column 24 is operated at a temperature of from 20° C. (68° F.) to 83° C. (181° F.) and a pressure from 33 millimeters to 760 millimeters so as to distill overhead through line 25 isopropyl alcohol. The bottoms from column 14 are sent through line 27 to cumene distillation column 26. If the hydrogenation is carried out under conditions which do not favor conversion of acetone to isopropyl alcohol the bottoms from acetone column 20 can be sent directly to cumene distillation column 26. The distillation zone 26 is operated at a temperature say from about 38° C. (100° F.) to 152° C. (306° F.) and a pressure from about 10 millimeters to 760 millimeters to separate cumene which is taken off as overhead through line 29 and stored. The bottoms from separation zone 26 are taken through line 31 to distillation zone 30. In distillation zone 30 phenol is distilled overhead at a temperature of about 40° C. (104° F.) to 182° C. (360° F.) at a pressure of 1 millimeter to 760 millimeters and taken off through line 33. If desired, 10% or more of the lightest overhead fraction of the phenol stream can be recycled through line 35 to the hydrogenation zone 12 to ensure more complete conversion of α-methylstyrene to cumene.

The bottoms from separation zone 30 are passed through line 37 to distillation tower 38 wherein acetophenone is distilled and taken off as overhead through line 39. Distillation tower 38 can be operated at a temperature of about 15° C. (59° F.) to 203° C. (397 F.) and at a pressure of 1 millimeter to 760 millimeters. The bottom residue from tower 38 is removed through line 40. All tower temperatures and pressures cited are at the tower top.

As indicated, the palladium and nickel-molybdenum catalysts can be employed with significant advantage to hydrogenate the entire reaction mixture resulting from the oxidation of cumene and decomposition and dehydration of the resulting product to effectively convert α-methylstyrene to cumene without adverse affect on the economically valuable phenol. Moreover, using the nickel-molybdenum catalyst and suitable reaction conditions acetone in this stream can be effectively converted, if desired, to isopropyl alcohol.

The hydrogenation catalyst can be employed in a finely divided state or supported on a suitable base or carrier such as alumina, charcoal, silica-alumina, silica gel, kieselguhr and the like. If the metal catalysts are supplied in the form of metal oxides the catalysts can be reduced prior to use in the invention. The percentage of the metal in the catalyst can vary widely and may, for example, range from about 0.1 to 17% or more.

The following examples give specific data on the hydrogenation process of the present invention.

EXAMPLE I

A mixture of products normally produced by the oxidation of cumene followed by decomposition and dehydration of the reaction product was hydrogenated at different temperatures. The feed mixture included acetone, cumene, α-methylstyrene (AMS), methylphenyl carbinol, phenol and acetophenone (AP). Table I shows the amounts of each component in the feed mixture or charge before hydrotreating and the amounts of each after hydrotreating at different temperatures. In each instance of the hydrogenations were carried out using a catalyst consisting of 0.5% palladium on a ⅛ inch alumina pellet and recycle hydrogen of 90–95% purity. The space velocity in each instance was 1.1 volume charge per hour per volume of catalyst.

As is seen from runs 1, 2 and 3 which were hydrotreated, α-methylstyrene was effectively converted to cumene. It will also be noted that in run No. 3, which was carried out at the highest temperature and pressure, the recovery of phenol was reduced somewhat with some conversion to cyclohexanol. For this reason it is preferred to carry out the hydrogenation under less severe conditions.

EXAMPLE II

A mixture of products normally produced by the oxidation of cumene followed by decomposition and dehydration of the reaction product was hydrogenated at different temperatures and pressures. The feed mixture included acetone, cumene, α-methylstyrene (AMS); phenol, methylphenyl carbinol and acetophenone. Table II shows the amounts of each component in the feed mixture or charge before hydrotreating and the amounts of each after hydrotreating at different temperatures and pressures. The space velocity utilized for each hydrogenation run was 1.1 volume charge per hour per volume of catalyst. The hydrogenation runs were carried out using a hydrogenation catalyst of the following typical analysis.

Physical properties:
  Surface area, M²/GM. _____ 200–300
  Pore volume, CC./GM. _____ 0.50–0.60
  Average pore diameter, A. _____ 100–120
  Apparent bulk density, lbs./cu. ft. _____ 30–40
  Side crush strength, lbs.—
    ³⁄₁₆″ x ³⁄₁₆″ tablets _____ 25±5
    ⅛″ diam. extrusion _____ 20±5
    ¹⁄₁₂″ diam. extrusion _____ 15±3
    ¹⁄₁₆″ diam. extrusion _____ 10±2

Chemical composition:
  Nickel oxide, wt. percent NiO _____ 3.5–4.5
  Molybdenum oxide, wt. percent $MoO_3$ __ 13.0–15.0
  Sodium oxide, wt. percent $Na_2O$ Maximum___ 0.05%
  Iron oxide, wt. percent $Fe_2O_3$ ____do____ 0.20%
  Chlorides, wt. percent _____do____ 0.10%

This catalyst was prereduced with hydrogen for 6 hours at 300 p.s.i.g. above 700° before using.

TABLE II

| Sample | Hydrogenator highest temp., °F. | Press., p.s.i.g. | Percent acetone | Percent isopropanol | Percent cumene | Percent AMS | Percent AP | Percent methyl phenyl carbinol | Percent phenol |
|---|---|---|---|---|---|---|---|---|---|
| Charge | | | 31.61 | | 15.52 | 5.10 | 2.93 | 0.40 | 44.44 |
| Run No. 1 [1] | 170 | 100 | 29.89 | 2.28 | 18.18 | 2.68 | 2.63 | 0.38 | 43.96 |
| Run No. 2 [1] | 225 | 100 | 28.27 | 2.65 | 20.47 | 0.97 | 2.47 | 0.42 | 44.75 |
| Run No. 3 [1] | 231 | 300 | 23.60 | 7.90 | 19.27 | 1.06 | 2.37 | 0.54 | 44.33 |
| Run No. 4 [1] | 277 | 300 | 18.22 | 14.11 | 20.36 | 0.40 | 1.72 | 0.49 | 43.85 |

[1] Hydrogenation product of run.

As will be noted, α-methylstyrene is converted to cumene and under more severe hydrogenation conditions acetone is converted to isopropanol.

To obtain the results of the foregoing examples, a gas chromatograph having an accuracy of ±1% was employed.

The advantages of the present invention are apparent from the foregoing description. Thus, the present invention provides a simple process whereby α-methylstyrene can be readily converted to cumene in the presence of other products such as phenol without adverse effect thereon and without the necessity of separating the

TABLE I

| Sample | Hydrogenator highest temp., °F. | Press., p.s.i.g. | Percent acetone | Percent isopropanol | Percent cumene | Percent cyclohexanol | Percent AMS | Percent AP | Percent methyl phenyl carbinol | Percen phenol |
|---|---|---|---|---|---|---|---|---|---|---|
| Charge | | | 33.64 | | 11.88 | | 4.53 | 3.06 | 0.20 | 46.11 |
| Run No. 1 [1] | 151 | 100 | 34.04 | | 16.71 | | 0.20 | 3.11 | 0.18 | 45.02 |
| Run No. 2 [1] | 173 | 100 | 33.04 | | 16.75 | | 0.11 | 2.32 | 0.27 | 46.83 |
| Run No. 3 [1] | 219 | 100 | 33.92 | Trace | 17.09 | 2.93 | | 2.75 | | 42.26 |

[1] Hydrogenation product of run.

α-methylstyrene as a separate stream thereby eliminating the need for separate α-methylstyrene distillation towers. By hydrogenating α-methylstyrene in the presence of all other products resulting from the cumene-phenol process substantially complete conversion thereof to cumene can be readily achieved since the amount of α-methylstyrene in the stream undergoing hydrogenation is relatively low in the contrast to the situation wherein α-methylstyrene is separated and then separately hydrogenated. In the present process all of the phenol in the charge stream passes through the hydrotreater and α-methylstyrene is hydrotreated before it reaches the high temperature zone of the cumene distillation tower. Accordingly, the tendency of α-methylstyrene to polymerize and form high boiling polymers is minimized. Moreover, in accordance with one embodiment of the present invention, acetone can be converted to isopropyl alcohol simultaneously with the conversion of α-methylstyrene to cumene.

Those modifications and equivalents which fall within the spirit of the invention and the scope of the appended claims are to be considered part of the invention.

We claim:
1. A process of treating a reaction mixture resulting from the production of phenol by oxidation of cumene and decomposition and dehydration of the reaction product and including phenol, acetone, α-methylstyrene and acetophenone which process comprises hydrogenating said reaction mixture by contacting said mixture with hydrogen in the presence of a palladium hydrogenation catalyst at a temperature of from about 80 to 225° F. and a pressure of from atmospheric to about 150 p.s.i.g. and subjecting the hydrogenation reaction mixture to a series of separations to separate cumene and phenol and acetone.

2. The process of claim 1 wherein the hydrogenation is carried out at a temperature of from about 100 to about 200° F and at a pressure of from atmospheric to about 100 p.s.i.g.

3. A process of treating a reaction mixture resulting from the production of phenol by oxidation of cumene and decomposition and dehydration of the reaction product and including phenol, acetone, α-methylstyrene and acetophenone which process comprises hydrogenating said reaction mixture by contacting said mixture with hydrogen in the presence of a nickel-molybdenum hydrogenation catalyst at a temperature of from about 100 to 300° F. and a pressure of from atmospheric to about 500 p.s.i.g. and subjecting the hydrogenation reaction mixture to a series of separations to separate cumene, phenol and isopropyl alcohol.

4. The process of claim 3 wherein the hydrogenation is carried out at a temperature of from about 200 to about 300° F. and a pressure of from about 300 to 500 p.s.i.g.

References Cited
UNITED STATES PATENTS
3,205,272  9/1965  Pollitzer _____ 260—621

FOREIGN PATENTS
166,709  3/1965  U.S.S.R.

OTHER REFERENCES
Fieser et al., Organic Chemistry, Reinhold Publishing Co., New York, 1956, p. 121.

LEON ZITVER, *Primary Examiner.*

H. ROBERTS, *Assistant Examiner.*

U.S. Cl. X.R.
260—638, 674, 593, 667